July 7, 1925.

L. A. NOEL 1,544,771

FIVE-PHASE TWO-STROKE INTERNAL COMBUSTION ENGINE

Filed May 11, 1922   3 Sheets-Sheet 1

Inventor
L. A. Noel,
By Marks & Clerk
Attys.

July 7, 1925.  
L. A. NOEL  
1,544,771

FIVE-PHASE TWO-STROKE INTERNAL COMBUSTION ENGINE

Filed May 11, 1922     3 Sheets-Sheet 2

Inventor  
L. A. Noël,  
By Marks & Clerk  
Attys.

July 7, 1925. 1,544,771
L. A. NOEL
FIVE-PHASE TWO-STROKE INTERNAL COMBUSTION ENGINE
Filed May 11, 1922 3 Sheets-Sheet 3
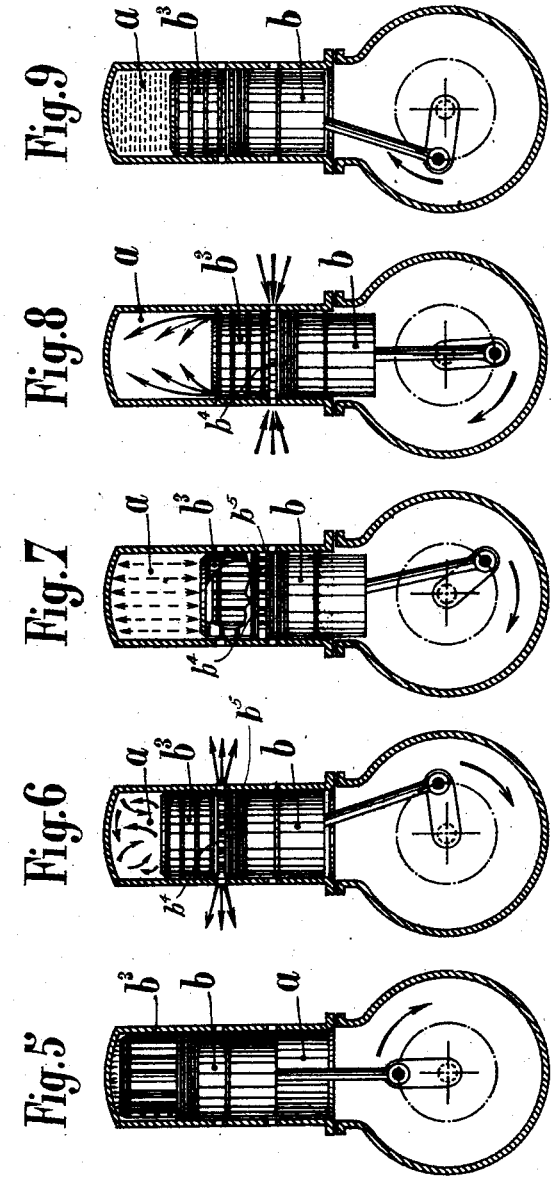
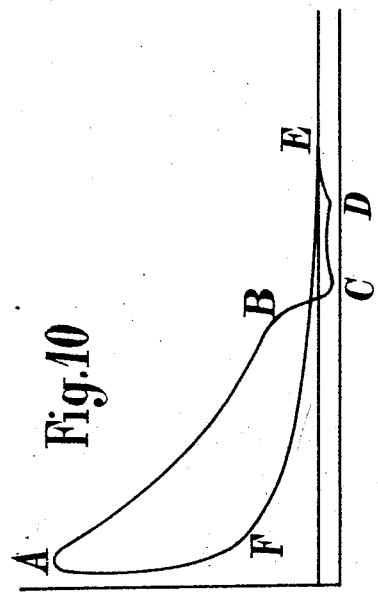
Inventor
L. A. Noël,
By Marks Clerk
Attys Patented July 7, 1925.

1,544,771

UNITED STATES PATENT OFFICE.

LOUIS ANDRÉ NOËL, OF PARIS, FRANCE.

FIVE-PHASE TWO-STROKE INTERNAL-COMBUSTION ENGINE.

Application filed May 11, 1922. Serial No. 560,212.

*To all whom it may concern:*

Be it known that I, LOUIS ANDRÉ NOËL, a citizen of the French Republic, residing at 29 bis Rue Saint-Didier, Paris, France, have invented new and useful Improvements in Five-Phase Two-Stroke Internal-Combustion Engines, of which the following is the specification.

This invention relates to an internal combustion engine the cycle of which comprises five phases and is completed in two strokes.

It is adapted to increase the thermal efficiency of internal combustion engines, whilst simplifying them concerning the parts and particularly to ensure their operation with any fuels and especially liquid and even solid heavy fuels.

It is also adapted to ensure the spontaneous ignition of the explosive charge at any working speed, without heating, with any fuel and by doing away with any premature ignition and any knocking.

The present invention consists essentially in devising the cylinders and the pistons of the said internal combustion engines, so as to obtain therein at each downward stroke of the pistons: 1°—a short expansion of the combustion gases; 2°—an exhaust at very high pressure and very great speed, but of a portion only of the said gases; 3°—the creation within the cylinder, of a partial vacuum, resulting at the same time from the rapid exhaust of the gases and from the displacement of the piston; 4°—the suction of a volume of fresh fuel or gas very much less than the capacity of the cylinder, then at each reascending stroke, compression of the total volume of the charge which is, consequently, largely composed of residual gases and, in less quantity, of fresh fuel.

It consists also in determining the formation and composition of the gaseous mass or fuel, so that a portion of the residual gases of the previous explosion is kept in the cylinder and is subjected therein to a disassociation of its elements, created by the present device itself in the following manner. Subsequently to the very violent exhaust determined at a high pressure with this machine constructed in accordance with this invention, the gases left within the cylinder are considerably cooled and, consequently, they are subjected to a movement of contraction tending to bring them backward, but during the execution of this movement, the piston continues to move and increases the inner volume of the enclosed container constituting at this moment the cylinder and the same gases are immediately urged to alter again the direction of their displacement and to move again forward, whilst being reheated by the walls. These gases are thus subjected to violent and repeated agitations resulting in an unbalancing of their atomic forces and the separation or dissolution of their elements.

The oxygen, hydrogen and carbon thus released by the said dissociation of carbon dioxide, water vapour or carbon monoxide, residue of the preceding explosion, become capable of combining again with the other elements of the fresh fuel.

The mixture of all these elements which have just been separated or released from each other is thus largely facilitated and acquires a perfect homogeneity owing to the compression which follows, upon return of the piston.

The whole of the charge becomes by these means a very homogeneous mixture of combustion supporting agent and fuel in the nascent state, eminently suitable for the combustion or explosion which is, by this fact, rendered compulsorily spontaneous after a determined compression. It is accompanied by a moderate temperature, whilst its breaking effects are entirely deadened by the presence of a large quantity of a neutral gas which is the nitrogen of the air sucked in.

The phenomenon of dissociation determined by the invention being particularly of mechanical order and independent from the volatility of the fuel used, it will always take place in all cases, as well with volatile fuels as with heavy fuels, it will even occur with solid fuels, provided they are, in this case, in a pulverized state.

This invention consists, for the purpose of obtaining the results indicated above, in constituting the pistons of these engines in two parts sliding on each other; one of these two parts comprises the body of the piston and is connected to the connecting rod; the other is capable of sliding on the first one according to an extent limited by stops between which it remains free for certain portions of its stroke in the cylinder. When these two parts are moved together, they present a fluid tight joint. On the contrary, when they move apart by their sliding movement, they leave between them an interval through which pass the gases.

The said cylinder is provided with a series of exhaust ports and with a series of suction or inlet ports, which are alternately opened or closed by either part of the piston.

The said invention consists moreover in a number of other arrangements which are preferably used with those just indicated.

The invention relates more particularly to certain forms of carrying out the described arrangements, without being limited thereto, and on the other hand, as new industrial products, it relates to machines to which these arrangements are fitted.

This invention will be clearly understood by the following description, which is given by way of example only, with reference to the accompanying drawing in which:

Figs. 5 to 9 are sectional and outer views, with portions cut away, of an engine constructed in accordance with this invention, each of these figures showing one of the five phases of the cycle of the invention.

Fig. 10 is a view of the diagram of the cycle.

Figure 1:
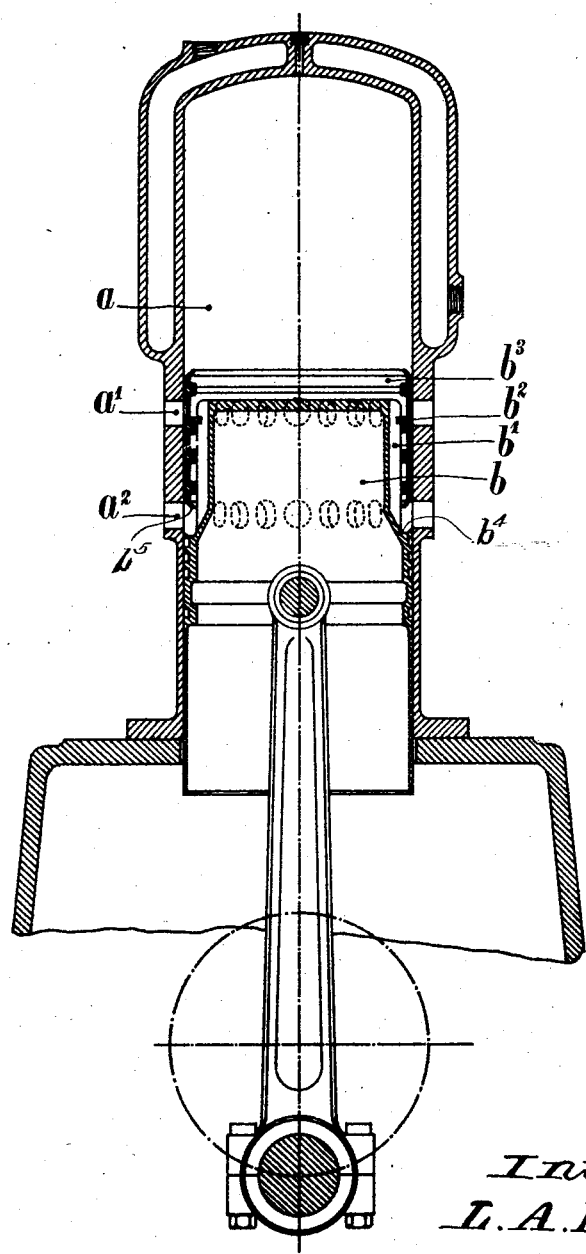
Fig. 1 is an axial section of an engine made in accordance with this invention.
Figure 2:
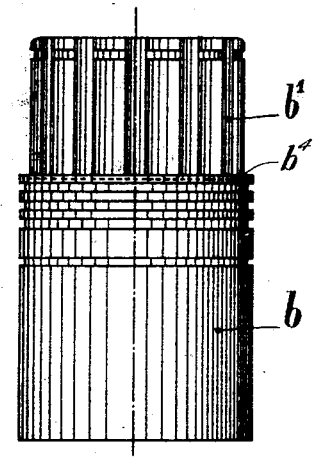
Fig. 2 is an outer view of the part of the piston connected to the link.
Figure 3:
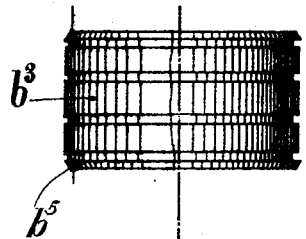
Fig. 3 is partly an outer view, partly a sectional view of the part of the piston adapted to slide on that shown in Fig. 2.
Figure 4:
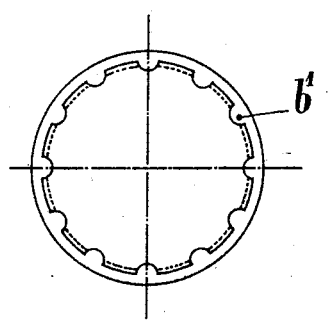
Fig. 4 is an elevation and a plan view of the stop ring limiting the sliding stroke of the parts of the piston on each other.
Figure 4:
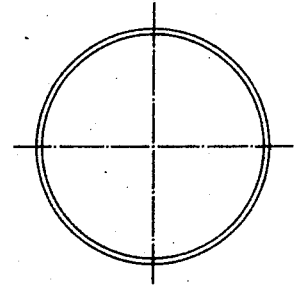
Figure 4:
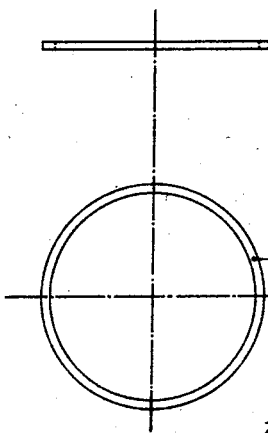

In Fig. 1, the cylinder $a$ perforated with exhaust ports $a^1$ and inlet ports $a^2$ is illustrated in axial section as well as the piston body B which is provided at the head end with a reduced portion $b$ having grooves $b'$ therein. The shoulder intermediate the piston and its reduced end is inclined for a purpose which will hereinafter appear. Towards the top of the reduced end of the piston is formed a circular channel in which is arranged a stop ring $b^2$. A sleeve-like piston member $b^3$ is slidably mounted on the reduced end of the piston body $b$.

The movement of the member $b^3$, in one direction, is limited by the abutment $b^2$ of the piston $b$ and, in the opposite direction, by the seat $b^4$ on which bears in a fluid-tight manner the lower end $b^5$ of the member $b^3$.

The member $b^3$ acts in the same way as an automatic slide-valve controlling passage of fluid to and from the cylinder shown in Figs. 5 to 9.

In Fig. 5, the piston is shown at the time of the explosion; the part B of the piston will move down driven by the gases; the member $b^3$, owing to its adherence to the cylinder, remains stationary until the abutment $b^2$ engages and actuates it.

In Fig. 6, the annular space between the piston body B and the member $b^3$ is opposite of the exhaust ports $a^1$, realizing the second phase of the cycle or exhaust phase; this phase takes place during a relatively short time, but the gases, although being in the expansion period, have still a high pressure and, passing through, large outlets, escape at a very great speed; the pressure in the working chamber rapidly lowers below atmospheric pressure and, from the time the member $b^3$ has covered the ports $a^1$, there begins the third phase illustrated in Fig. 7; the piston creates a new partial vacuum behind it realizing this third phase.

In Fig. 8, the annular space between the piston body and its member $b^3$ is opposite the inlet ports $a^2$ through which the gaseous mixture enters, sucked in by the partial vacuum created during the previous or third phase. This admission period constitutes the fourth phase of the cycle.

The fifth phase is the compression phase; the piston moving upwardly, the member $b^3$ being overtaken and driven by the part B of the piston, the member $b^3$ bearing upon its seat $b^4$, closing all communication between the working chamber and the periphery of the piston.

It is to be understood that the respective dimensions of the engine the operation of which has been previously indicated are so chosen that the member $b^3$ cannot uncover the exhaust ports during the suction period. Fig. 10 shows the characteristic diagram of the cycle realized by the invention and which has just been described.

What I claim as my invention and desire to secure by Letters Patent is:

1. In an internal combustion engine, a cylinder having a combustion chamber, and inlet and exhaust ports in the wall thereof, a piston arranged in the cylinder and having a reduced head portion, a sleeve member arranged between the wall of the cylinder and the reduced portion of said piston, the piston and sleeve member having a passage therebetween communicating with the combustion chamber, said sleeve member being movable relative to the piston, and means to limit the movement of the sleeve member with respect to the piston whereby at each change in the direction of movement of the piston, the inertia of the sleeve member acts to move the latter axially with respect to the piston alternately in one direction and the other to connect the combustion chamber, through the passage between the sleeve member and the piston successively with the exhaust and inlet ports in the cylinder wall, whereby during the power stroke of the piston, there is permitted a brief expansion of the ignited gases, and, as the space between the piston and sleeve member registers with the exhaust port, an exhaust at high pressure and high speed of a portion only of the products of combustion, the creation of a partial vacuum in the cylinder resulting at once from the rapid exhaust and from the further movement of the piston, the suction through the inlet port of a volume of fresh fuel, and, on the compression stroke of the piston, compression of the total charge composed in greater part of residual gases and in smaller part of fresh combustible fuel.

2. In an internal combustion engine, a cylinder having a combustion chamber and inlet and exhaust ports in the wall thereof, a piston arranged in the cylinder and having a reduced head portion, the reduced head portion of the piston defining an inclined shoulder constituting a seat, a sleeve member arranged between the wall of the cylinder and the reduced portion of said piston and engageable with the seat thereon, the piston and sleeve member having a passage therebetween communicating with the combustion chamber, said sleeve member being movable relative to the piston, a stop member for limiting the movement of the sleeve member with respect to the piston whereby at each change in the direction of movement of the piston, the inertia of the sleeve member acts to move the latter axially with respect to the piston alternately in one direction and the other to connect the combustion chamber, through the passage between the sleeve member and the piston successively with the exhaust and inlet ports in the cylinder wall, whereby during the power stroke of the piston, there is permitted a brief expansion of the ignited gases, and, as the space between the piston and sleeve member registers with the exhaust port, an exhaust at high pressure and high speed of a portion only of the products of combustion, the creation of a partial vacuum in the cylinder resulting at once from the rapid exhaust and from the further movement of the piston, the suction through the inlet port of a volume of fresh fuel, and, on the compression stroke of the piston, compression of the total charge composed in greater part of residual gases and in smaller part of fresh combustible fuel.

In testimony whereof I have signed my name to this specification.

LOUIS ANDRÉ NOËL.